United States Patent [19]

Weng

[11] Patent Number: 5,025,827

[45] Date of Patent: Jun. 25, 1991

[54] STRUCTURE OF FLUID LEVEL CONTROLLER OF PIPING TYPE

[76] Inventor: Evans Weng, No. 1, 4 Nong, 63 Lane, Fu Shing Rd., Taipei, Taiwan

[21] Appl. No.: 508,755

[22] Filed: Apr. 12, 1990

[51] Int. Cl.⁵ .................... F16K 31/08; F16K 33/00; H01H 35/18; H01H 36/02

[52] U.S. Cl. .................... 137/392; 73/306; 73/313; 137/413; 137/429; 200/84 C; 251/65; 307/118; 335/206; 361/178; 417/40

[58] Field of Search ............... 137/392, 412, 413, 429; 73/304 R, 306, 308, 313; 200/84 C, 81.9 M; 335/153, 206; 417/36, 40; 340/623, 624; 307/118; 361/178; 251/65

[56] References Cited

U.S. PATENT DOCUMENTS

| | | | |
|---|---|---|---|
| 3,563,574 | 2/1971 | Jackson et al. | 285/235 |
| 3,595,267 | 7/1971 | Anderson | 200/84 C |
| 3,646,293 | 2/1972 | Howard | 73/313 |
| 3,671,142 | 6/1972 | Calabrese | 137/392 |
| 3,826,139 | 7/1974 | Bachman | 73/313 |
| 3,982,087 | 9/1976 | Bachman | 200/84 C |
| 4,056,979 | 11/1977 | Bongort et al. | 73/313 |
| 4,186,419 | 1/1980 | Sims | 200/84 C |
| 4,591,193 | 5/1986 | Oltmanns et al. | 285/138 |
| 4,739,786 | 4/1988 | Parkinson | 137/392 |

OTHER PUBLICATIONS

B/W Controls, Inc., "B/W Unifloat Liquid Level Control Systems".

Primary Examiner—George L. Walton
Attorney, Agent, or Firm—Varndell Legal Group

[57] ABSTRACT

A fluid level controller flexibly set up according to the number of level steps to be controlled and the pitch between such level steps, which comprises a plurality of joint pipes connected in series to form a pipe assembly; a ring-shaped magnetic floating member sleeved on such a pipe assembly to follow fluid level to move up and down; a plurality of reed elements having each a reed switch connected in series with one another and received in the joint pipes; a main control circuit comprising latching relays in quantity one less than the quantity of the reed elements and a plurality of controlled actuators respectively connected to the reed elements.

10 Claims, 4 Drawing Sheets

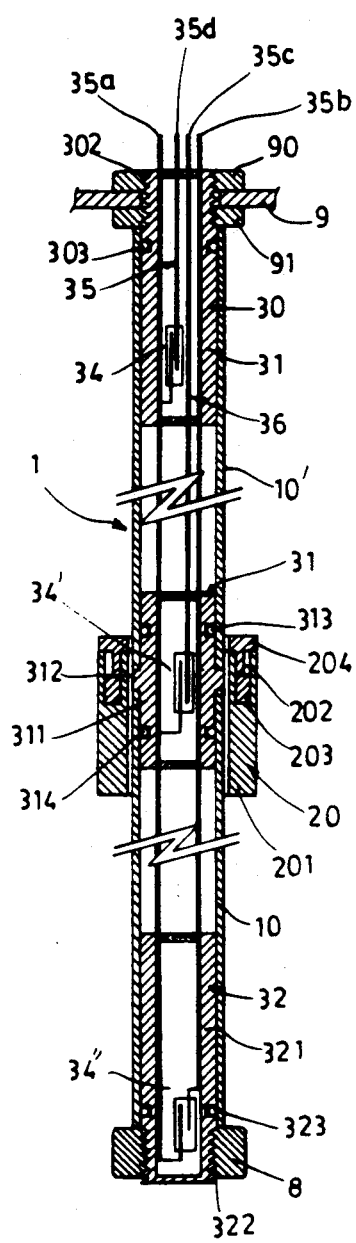
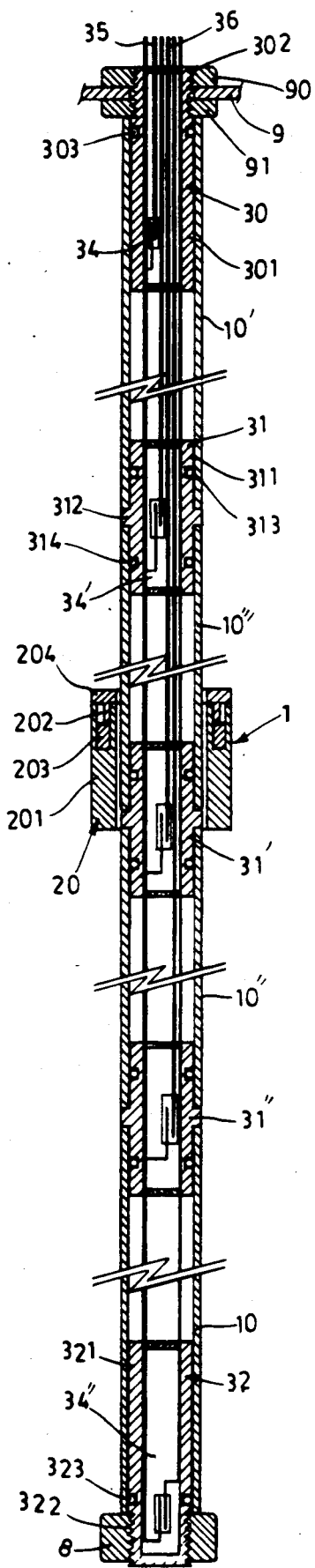
Fig. 6
Fig. 7

STRUCTURE OF FLUID LEVEL CONTROLLER OF PIPING TYPE

BACKGROUND OF THE INVENTION

1. Field of the Invention

The present invention is related to fluid level controllers and more particularly to a fluid level controller which comprises a pipe assembly formed of a plurality of joint pipes for receiving therein a plurality of reed elements to incorporate with a main control circuit for controlling the operation of controlled actuators so as to achieve fluid level controlling operation.

2. Description of the Prior Art

Conventional level controllers generally utilize a magnetic element to trigger a reed switch to control an actuator to start or stop an operation.

FIGS. 1 and 2 illustrate a known design of fluid level controlling system in which two fluid level controlling devices (the number of the controlling devices may be increased when more level steps are to be controlled) are respectively fastened in a fluid container at two different level positions. The controlling devices are each comprised of a float, a magnet and a reed switch. One disadvantage of this fluid level controlling system is the difficulty in installation, because mounting holes must be made on the side wall of the fluid container for the fastening of the controlling devices. In fastening controlling devices in the mounting holes, care must be taken to avoid leakage. Any mounting error may affect the normal fluid level control operation. Therefore, the mounting of controlling devices must be made by an experienced professional technician. When more level steps are to be controlled, more controlling devices must be used, and the installation procedure will become more complicated. After controlling devices are fastened in a fluid container, they can not be adjusted. If it is desired to change the position of fixed controlling devices, a new fluid container must be used or the mounting holes of the original fluid container must be sealed and new mounting holes must be made again. Further, while stirring fluid in a fluid container for mixing, the reed stitches of the fluid level controlling devices therein may be erroneously triggered due to swaying of fluid.

FIGS. 3 and 4 illustrate another reed type of fluid level controllers which comprise each a single magnetic floating member and are vertically fastened in a fluid container by securing to the top cover of a fluid container without drilling any mounting hole. However, when several level steps are to be controlled, the quantity of controllers must be relatively increased. As a consequence, the installation process is complicated and more space occupation is required.

SUMMARY OF THE INVENTION

One object of the present invention is to provide a fluid level controller which is easy to assemble and accurate in performance.

Another object of the present invention is to provide a fluid level controller which can be flexibly built up according to the number of level steps to be controlled.

To achieve the aforesaid objects, a fluid level controller in accordance with the present invention shall comprise a plurality of joint pipes in a suitable length according to pitch between the level steps which are to be controlled, and connected in series to form a pipe assembly; a ring-shaped magnetic floating member sleeved on such a pipe assembly to follow fluid level to move up and down; a plurality of reed elements having each a reed switch connected in series with one another and received in the joint pipes; a main control circuit comprising latching relays in quantity one less than the quantity of the reed elements and a plurality of controlled actuators respectively connected to the reed elements. The pipe assembly of the joint pipes is vertically fastened in a fluid container permitting the magnetic floating member to follow fluid level to move vertically along the pipe assembly. When the magnetic floating member moves toward or away from each reed element, the reed switch of such a reed element is simultaneously turned on/off to further drive a corresponding latching relay of the main control circuit to turn on/off a corresponding actuator so as to achieve the performance of fluid level control operation.

BRIEF DESCRIPTION OF THE DRAWINGS

FIG. 6 is a sectional assembly view of the fluid level controller of FIG. 5;

FIG. 7 is a sectional assembly view of an alternate form of the present invention.

DETAILED DESCRIPTION OF THE PREFERRED EMBODIMENTS

Figure 2:
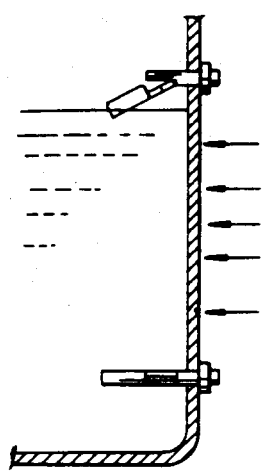
FIG. 2 is a sectional view thereof.
Figure 1:
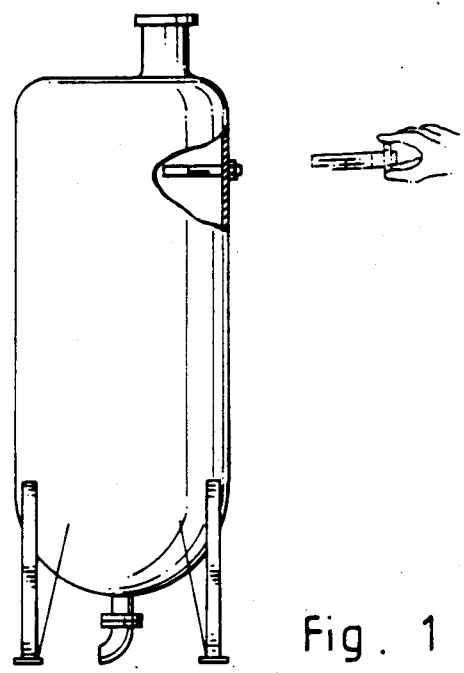
FIG. 1 illustrates a fluid container which is equipped with a fluid level controller according to the prior art.
Figure 3:
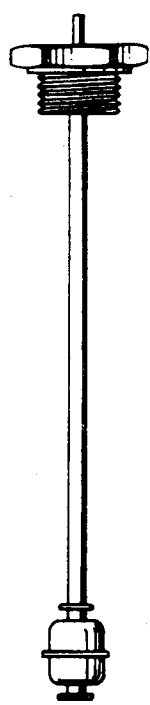
FIGS. 3 and 4 are perspective views of another type of fluid level controller according to the prior art.
Figure 4:
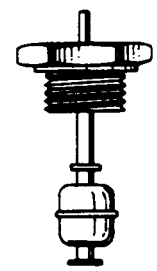
Figure 5:
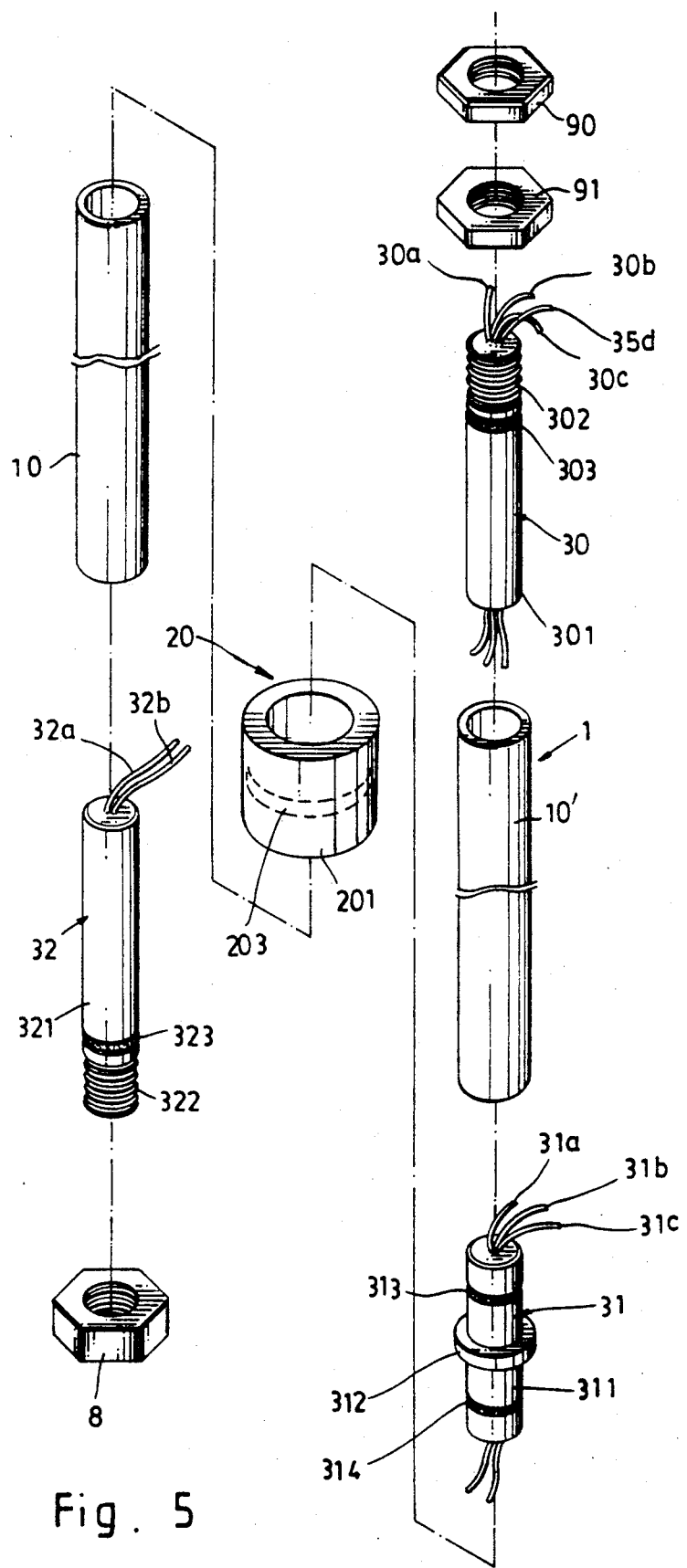
FIG. 5 is a perspective fragmentary view of a fluid level controller according to the present invention.

Referring to FIGS. 5 and 6, a fluid level controller of the present invention is generally comprised of a plurality of joint pipes 10, 10', a magnetic floating member 20, a plurality of reed elements 30, 31, 32, and a main control circuit assembly 50. When in use, the fluid level controller is vertically fastened in a fluid reservoir and firmly secured to the top cover 9 of such a fluid reservoir by means of two lock nuts 90, 91.

The joint pipes 10, 10' are connected in series to form a pipe assembly 1 which is made of hollow, non-magnetic tubes in length according to the pitch between the level steps to be controlled, and in quantity one less than the quantity of the reed elements, i.e. in quantity equal to the number of level steps to be controlled.

The magnetic floating member 20 comprises a floating ring 201 defining therein a ring-shaped channel 202 sealed with a seal ring 204 with a ring-shaped magnet 203 received therein. During assembly, the magnetic floating member 20 is sleeved on the pipe assembly 1 to float according to the change of fluid level.

The reed elements includes at least one high level reed element 30, one low level reed element 32, and one or more intermediate reed elements 31, in which the quantity of intermediate reed elements 31 is determined according to the number of level steps to be controlled. The reed elements 30, 31, 32 comprise each a tubular body 301, 311 or 321 in seize suitable for insertion in the pipe assembly 1 and internally filled with epoxy resin with a reeder 34, 34' or 34" respectively set therein (see FIG. 6). The tubular bodies 301, 321 of the high and low level reed elements 30, 32 comprise each an outer thread portion 302 or 322 at one end, wherein two lock nuts 90, 91 are mounted on the outer thread portion 302 of the tubular body 301 of the high level reed element 30 for positioning, and a stopper member 8 is mounted on the outer thread portion 322 of the tubular body 321 of the low level reed element 32 to protect the magnetic floating member 20 from breaking away. Two O-rings 303, 323 are respectively mounted on the tubular bodies 301, 321 of the high and low level reed elements 30, 32 to protect against water permeation and secure the positioning after both reed elements 30, 32 are inserted in the joint pipes 10, 10'. The tubular body 311 of the intermediate reed element 31 comprises an unitary projecting collar 312 in the middle and in outer diameter equal to the inner diameter of the joint pipes 10, 10'. The outer diameters of the unitary projecting collar 312 and the joint pipes 10, 10' are the same. Two O-rings 313, 314 are respectively mounted on the tubular body 311 of the intermediate reed element 31 at both ends thereof to protect against water permeation. The conductors of the reeders 34, 34', 34" of the reed elements 30, 31, 32 are extending upward from the top of the reed elements 30, 31, 32, as shown in FIG. 6, wherein a reed element of higher level comprises conductors in quantity one more than a reed element of next lower level, i.e. the low level reed element 32 comprises two conductors 32a, 32b; the intermediate level reed element 31 comprises three conductors 31a, 31b, 31c; the high level reed element 30 comprises four conductors 30a, 30b, 30c, 35d. During assembly, the conductors 30a, 31a and 32a are connected in series to form a conductor 35a; the conductors 30b, 31b, 32b are connected in series to form a conductor 35b; the conductors 30c, 31c are connected in series to form a conductor 35c. After the conductors are respectively connected in series, the tubular bodies 301, 311, 321 of the three reed elements 30, 31, 32 are respectively received in the joint pipes 10, 10'.

Figure 8:
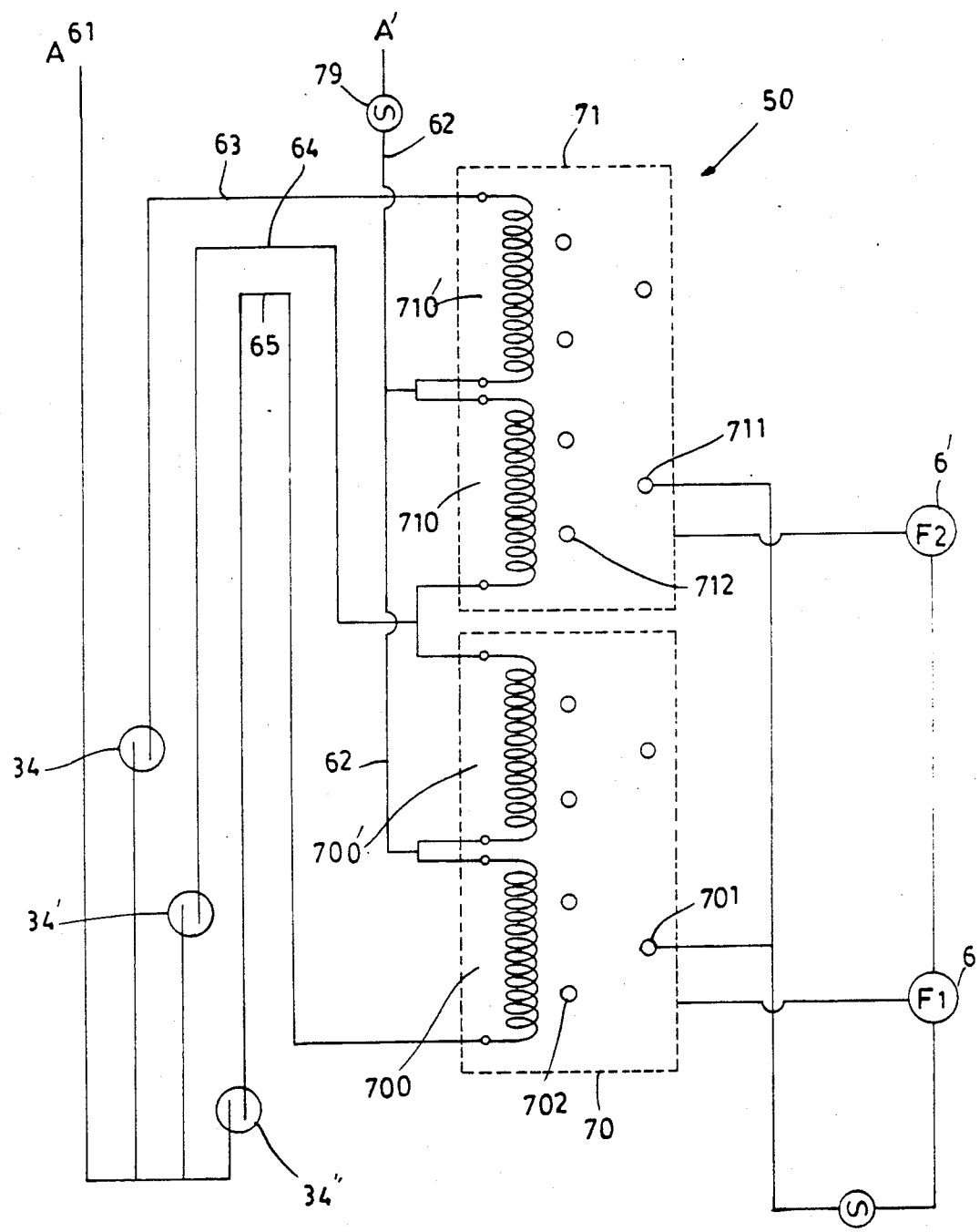
FIG. 8 is a circuit diagram of the main control circuit of the present invention.

Referring to FIG. 8, the main control circuit assembly 50 is comprised of a plurality of conductors 61, 62, 63, 64, 65; a certain quantity of latching relays 70 and 71 (or stepping relays or solid relays) in quantity one less than the quantity of the reed elements 30, 31 and 32 (i.e. two in the present embodiment); and a plurality of controlled actuators or fluid controllers (i.e. pumps or solenoids) 6, 6', wherein the conductors 61, 62 are for connection to the two poles of a power source. The conductor 61 is simultaneously connected with the conductor 35a. The conductor 62 is simultaneously connected in series with a common conductor 62' from two pair of coils 700, 700', 710, 710' of the latching relays 70, 71. The conductor 63 is connected with the conductor 35d and the coil 710' of the latching relay 71. The conductor 65 is connected with the conductor 35b and the coil 700 of the latching relay 70. The contacts 701, 702, 711, 712 of the latching relays 70, 71 are respectively connected to the controlled actuators 6, 6'.

The operation of the aforesaid main control circuit 50 during a filling operation is outlined hereinafter. As the magnetic floating member follows fluid level change and moves next to the reed element 32, it triggers the reeder 34" to closed for permitting the coil 700 of the latching relay 70 to excite, so that the contacts 701, 702 are connected to turn on the controlled actuator (or fluid controller) 6 to fill the tank with fluid thus causing the fluid level to rise. Although the reeder 34" is released from the magnetic floating member 20 when the magnetic floating member follows the fluid level to move upward, the contacts 701, 702 are still in connection with each other and the operation of the controlled actuator 6 continues. As soon as the magnetic floating member 20 continuously moves upward to reach to the level of the intermediate reed element 31, the reeder 34' is immediately turned on to drive the coil 700' of the latching relay 70 to excite and to simultaneously cut off the connection of the contacts 701, 702. Thus, the operation of the controlled actuator 6 is stopped, and the fluid level control is fixed. The coil 710 of the latching relay 71 excited to connect the contact 711 with the contact 712 so as to drive the controlled actuator 6' to operate when the coil 700' of the latching relay 70 is excited to cut off the contacts 701, 702. This can be useful when mixing two or more kinds of fluids, where one fluid is fed into the tank by controlled actuator 6 and another fluid is fed into the tank by controlled actuator 6'. In the same manner, when the magnetic floating member 20 moves to the high level reed element 30, the coil 710' of the latching relay 71 is excited to cut off the connection of the contacts 711, 712, so as to further stop the operation of the controlled actuator 6'. By means of the said operation, automatic feeding control for different proportion of different fluid can be efficiently and accurately proceeded. As soon as the highest level control is fixed, the main switch 79 of the latching relays 70, 71 is turned off. After mixed fluid is consumed up and the magnetic floating member 20 moves down to the lower limit, the power switch is turned on again for next level control operation.

FIG. 7 illustrates an alternate form of the present invention, in which five pieces of reed elements 30, 31, 32, 31', 31" are incorporated with four pieces of joint pipes 10, 10', 10", 10''' to form a four-step fluid level control.

I claim:

1. A pipe joint type fluid level controller for a tank, comprising:

a plurality of joint pipes connected in series to form a pipe assembly;

a plurality of reed elements disposed within a plurality of sleeve members and sealably arranged within said joint pipes and in direct abutting relationship with one another, each reed element having a single reed switch contained therein, a conductor connected to a common terminal of said reed switch and a conductor connected to an active terminal of said reed switch;

a single magnetic floating member sleeved on said pipe assembly and slidable from one end to the other end thereof;

a main control circuit connected to said reed elements and comprised of at least one latching relay and at least one fluid controller, said main control circuit comprising a plurality of conductors, latching relays in quantity one less than the quantity of said reed elements, and fluid controllers in quantity equal to said latching relays, said latching relays each comprising two coils, said coils respectively having a first terminal connected in series with said common terminal of said reed switches for further connection to a power supply and a second terminal connected with at least one active terminal of said reed switches, and each said latching relay is respectively connected to one fluid controller;

wherein said main control circuit performs fluid level control operation by alternatively turning its respective fluid controller on and off in response to said magnetic floating member following a fluid level by moving up and down along said pipe assembly and alternatively turning said reed switches on and off and wherein the number of said joint pipes and said reed elements are changed to control a different number of level steps with an equal number of controlling reed elements to accommodate different size tanks.

2. A fluid level controller as claimed in claim 1, wherein said joint pipes are made of hollow tubes of nonmagnetic material each having a bore matching with the outer diameter of said reed elements and a length designed according to a preferred pitch between levels.

3. A fluid level controller as claimed in claim 1, wherein said magnetic floating member is movably sleeved on said pipe assembly and comprises a floating ring defining therein a closed ring-shaped channel with a ring-shaped magnet received therein.

4. A fluid level controller as claimed in claim 1, wherein said reed elements includes at least one high level reed element and one low level reed element, and a certain quantity of intermediate reed elements according to the number of level steps to be controlled.

5. A fluid level controller as claimed in claim 4, wherein said high and low level reed elements each comprise a tubular body having received therein a reeder and being filled with water proof packing material with a plurality of conductors projecting therefrom for connection, and having an O-ring externally mounted thereon and an outer thread portion externally made thereon at one end, and wherein two lock nuts are mounted on the outer thread portion of the tubular body of said high level reed element for positioning, and a stopper member is mounted on the outer thread portion of the tubular body of said low level reed element to protect said magnetic floating member from separating from said pipe assembly.

6. A fluid level controller as claimed in claim 4, wherein said intermediate reed element a tubular body comprises a tubular body having received therein a reeder and being filled with water proof packing material with a plurality of conductors projecting therefrom for connection, and having two O-rings externally mounted thereon at both ends to protect against entrance of water when the both ends thereof are respectively inserted in said joint pipes of said pipe assembly.

7. A fluid level controller as claimed in claim 4, wherein said low level reed element comprises two conductors extending from its reeder and connected in series with said intermediate reed elements and said high level reed element, said intermediate and high level reed elements comprising a plurality of conductors arranged in such a manner that a reed element of higher level has conductors in quantity one more than a succeeding reed element of lower level and the lowest one of said intermediate reed elements has conductors in quantity one more than said low level reed element.

8. A fluid level controller as claimed in claim 1, wherein said fluid controller can be a pump or solenoid valve.

9. A fluid level controller as claimed in claim 1, wherein said reed elements include a high level reed switch, an intermediate level reed switch, and a low level reed switch, and said main control circuit includes corresponding first and second latching relays, a first coil of said first latching relay having its second terminal connected to said active terminal of said high level reed switch, a second coil of said first latching relay and a first coil of said second latching relay having their second terminals connected to said active terminal of said intermediate reed, and a second coil of said second latching relay having its second terminal connected to said active terminal of said low level reed switch.

10. A fluid level controller as claimed in claim 9, wherein a first fluid controller for controlling flow of a first liquid is connected to said first latching relay and a second fluid controller for controlling flow of a second liquid is connected to said second latching relay, so that as said single magnetic floating member travels upward from a lowest point along said pipe assembly, said second fluid controller is turn on by said low level reed switch activating said second coil of said second latching relay, said second fluid controller is turn off and said first fluid controller is turned on by said intermediate reed switch activating said first coil of said second latching relay and said second coil of said first latching relay, and said first fluid controller is turn off by said high level reed switch activating said first coil of said first latching relay.

* * * * *